United States Patent [19]

DuBois et al.

[11] Patent Number: 5,397,841
[45] Date of Patent: Mar. 14, 1995

[54] GRAFTED POLYMERS HAVING REACTIVE GROUPS AT THE BASE

[75] Inventors: Donn A. DuBois; Robert J. Sutherland, both of Houston, Tex.

[73] Assignee: Shell Oil Company, Houston, Tex.

[21] Appl. No.: 163,809

[22] Filed: Dec. 8, 1993

[51] Int. Cl.$^6$ .................. C08L 33/06; C08L 33/00
[52] U.S. Cl. ..................... 525/227; 525/299; 525/218; 525/217; 525/235; 525/238
[58] Field of Search ........... 525/227, 314, 250, 271, 525/299, 309, 93, 218, 217, 235, 238

[56] References Cited

U.S. PATENT DOCUMENTS

| | | | |
|---|---|---|---|
| 3,786,116 | 1/1974 | Milkovich et al. | 525/276 |
| 4,075,186 | 2/1978 | Ambrose et al. | 525/308 |
| 4,092,375 | 5/1978 | Vreugdenhil | 525/194 |
| 4,151,231 | 5/1979 | St. Clair et al. | 522/110 |
| 4,156,673 | 5/1979 | Eckert | 524/534 |
| 4,358,565 | 11/1982 | Eckert | 525/280 |
| 4,503,188 | 3/1985 | Mancinelli | 525/98 |
| 4,526,927 | 7/1985 | Hambrecht et al. | 525/68 |
| 4,557,849 | 10/1985 | Eckert | 525/153 |
| 4,659,783 | 4/1987 | Spinelli | 525/293 |
| 4,767,824 | 8/1988 | Ouhadi et al. | 525/343 |
| 4,847,328 | 7/1989 | Hutchins et al. | 525/107 |
| 4,849,481 | 7/1989 | Rhodes et al. | 525/314 |
| 5,272,211 | 12/1993 | Sutherland et al. | 525/299 |
| 5,344,887 | 9/1994 | Sutherland et al. | 525/299 |
| 5,518,053 | 6/1993 | DuBois | 525/285 |

FOREIGN PATENT DOCUMENTS

| | | |
|---|---|---|
| 1523468 | 11/1976 | European Pat. Off. . |
| 2007686 | 10/1978 | United Kingdom . |
| 2144430 | 8/1983 | United Kingdom . |

*Primary Examiner*—James J. Seidleck
*Assistant Examiner*—M. L. Warzel
*Attorney, Agent, or Firm*—Keith M. Tackett

[57] ABSTRACT

The present invention provides grafted polymers that have pendent functional groups on the core of the polymer wherein the core is a polymerized alkylmethacrylate having a number average molecular weight from 500 to 1,000,000. The arms of the grafted polymer comprise anionically polymerized segments that have number average molecular weights from 1,000 to 300,000.

7 Claims, No Drawings

GRAFTED POLYMERS HAVING REACTIVE GROUPS AT THE BASE

FIELD OF THE INVENTION

This invention relates to polymers having polar groups. More particularly, the invention relates to highly branched or graft polymers having reactive groups.

BACKGROUND OF THE INVENTION

U.S. Pat. No. 4,503,188 describes the preparation of star-block polymers by reaction of anionically polymerized polymer segments with a multiester having the formula $(CH_2=CH-CO-O-)_n-X$ wherein X is the residue of a polyhydroxyl compound having n hydroxyl groups, and n is from 2 to 6. The anionically polymerized polymer segments such as a linear polybutadiene are essentially copolymerized with the unsaturation of the multiester to give a star structure having —CO—O— groups at the core of the star polymer.

U.S. Pat. No. 4,075,186 describes the preparation of branched polymers having from 25% to 75% by weight of a linear backbone of a polyacrylate following reaction of the polyacrylate with anionically polymerized polymer segments such as a linear polybutadiene. The polymer backbone has pendent —CO—OR groups that are partially consumed in the grafting reaction wherein R is a hydrocarbon radical having from 1 to 30 carbon atoms. The polyacrylate backbone has a minimum number average molecular weight of 10,000.

SUMMARY OF THE INVENTION

The present invention provides graft polymers that have pendent reactive groups that include esters (—CO—OR), anhydrides (—CO—O—CO—), amides (—CO—NRR'), imides (—CO—NR—CO—R'), nitriles (—CN), ketones (—CO—R), aldehydes (—CHO), acid halides (—CO—X), imines (—CNR), and halide groups on the core of the graft polymer wherein the core is a polymerized monomer containing reactive pendent groups having a number average molecular weight from 500 to 1,000,000. The arms of the graft polymer comprise anionically polymerized polymer segments that have number average molecular weights from 1,000 to 300,000.

DESCRIPTION OF THE INVENTION

The novel graft polymers of the invention are produced from linear base polymer segments by anionically polymerizing a conjugated alkadiene or an alkenyl aromatic compound to form a first polymer having terminal reactive groups and a peak molecular weight from 1,000 to 300,000, and reacting the first polymer with a second polymer having pendent reactive groups and a peak molecular weight from 500 to 1,000,000, wherein the pendent reactive groups are reactive with the terminal reactive groups on the first polymer. The resulting polymer retains some of the pendent reactive groups.

The polymers of the invention are exemplified by the following structures:

(A—)$_y$—M         (I)

(B—)$_y$—M         (II)

(A—B—)$_y$—M       (III)

(B—A—)$_y$M        (IV)

(A—B—A—)$_y$—M     (V)

(B—A—B—)$_y$—M     (VI)

(A—)$_y$—M—(—B)$_x$   (VII)

(A—B—)$_y$—M—(—B)$_x$ (VIII)

wherein each A is a homopolymer block or random copolymer block comprising predominantly polymerized alkenyl aromatic compounds, each B is a homopolymer block or random copolymer block comprising predominantly polymerized conjugated alkadienes, each M is a homopolymer, random copolymer, or block copolymer comprising pendent reactive groups such as esters (—CO—OR), anhydrides (—CO—O—CO—), amides (—CO—NRR'), imides (—CO—N-R—CO—R'), nitriles (—CN), ketones (—CO—R), aldehydes (—CHO), acid halides (—CO—X), imines (—CNR), and halide groups. Both x and y are integers representing multiple arms in a graft/comb configuration, preferably from 5 to 1,000 arms per molecule.

Other non-reactive comonomers may be copolymerized with the above monomers containing pendent reactive groups to form the M segment or block. Examples of non-reactive comonomers would be those defined as A and B and monomers such as ethylene, propylene, alpha-olefins and the like.

The alkenyl aromatic compound employed as each A block or segment in structures I–VIII is a hydrocarbon compound of up to 18 carbon atoms having an alkenyl group of up to 6 carbon atoms attached to a ring carbon atom of an aromatic ring system of up to 2 aromatic rings. Such alkenyl aromatic compounds are illustrated by styrene, 2-butenylnaphthalene, 4-t-butoxystyrene, 3-isopropenylbiphenyl, 4-vinylpyridiene, 2-vinylpyridine and isopropenyl-napthalene. The preferred alkenyl aromatic compounds have an alkenyl group of up to 3 carbon atoms attached to a benzene ring as exemplified by styrene and styrene homologs such as styrene, α-methylstyrene, p-methylstyrene, and α,4-dimethylstyrene. Styrene and α-methylstyrene are particularly preferred alkenyl aromatic compounds, especially styrene.

Each A block or segment in structures I–VIII is preferably at least 80% by weight polymerized alkenyl aromatic compound and is most preferably homopolymeric.

Each B block or segment in structures I–VIII is preferably at least 90% by weight of one or more polymerized conjugated alkadienes. Most preferably, the B segments or blocks are homopolymeric. The conjugated alkadienes preferably have up to 8 carbon atoms. Illustrative of such conjugated alkadienes are 1,3-butadiene (butadiene), 2-methyl-1,3-butadiene (isoprene), 1,3-pentadiene (piperylene), 1,3-octadiene, and 2-methyl-1,3-pentadiene. Preferred conjugated alkadienes are butadiene and isoprene, particularly isoprene. Within the preferred polyisoprene blocks or segments, the percentage of units produced by 1,4 polymerization is at least about 5% and preferably at least about 20%.

Each M block or segment may be homopolymeric or a block or random copolymer containing at least one monomer that contains a reactive pendent group as defined above.

Preferred monomers that contains reactive pendent groups include alkylmethacrylates and alkylmethacrylamides.

The alkyl esters have the following structure:

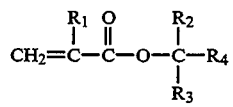

$$CH_2=C-C-O-C-R_4 \quad (A)$$

with $R_1$, $R_2$ on top positions and $R_3$ below, i.e.:

wherein $R_1$ is an alkyl, aryl or H group, $R_2$ is an alkyl group comprising from 1 to 10 carbon atoms or H, $R_3$ is an alkyl group comprising from 1 to 10 carbon atoms or H, and $R_4$ is an alkyl group of 1–30 carbons or H.

The preferred methacrylamides have the structure:

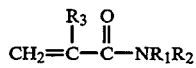

$$CH_2=C-C-NR_1R_2 \quad (B)$$

wherein $R_1$ is an alkyl comprising from 1 to 15 carbon atoms or aryl and $R_2$ is an alkyl comprising from 1 to 15 carbon atoms or aryl but not necessarily the same as $R_1$. $R_3$ is an alkyl, aryl or H group.

The processes for producing the graft polymers of structures I–VIII involve conventional polymerization of the linear components followed by reaction of the linear components to form the graft polymer. Such procedures preferably include the production by anionic polymerization of a living polymer of each type of monomer before reaction of the polymer components. In each procedure to form an anionic polymer of structures I–VIII, the monomers are anionically polymerized in the presence of a metal alkyl initiator, preferably an alkali metal alkyl. The use of such initiators in anionic polymerizations is well known and conventional. A particularly preferred initiator is sec-butyllithium.

The polymerization of the alkenyl aromatic compounds takes place in a non-polar hydrocarbon solvent such as cyclohexane or in mixed polar/non-polar solvents, e.g., mixtures of cyclohexane and an ether such as tetrahydrofuran or diethyl ether. Suitable reaction temperatures are from about 20° C. to about 80° C. and the reaction pressure is sufficient to maintain the mixture in the liquid phase. The resulting product includes a living poly(alkenyl aromatic compound) block having a terminal organometallic site which is used for further polymerization.

The polymerization of the conjugated alkadiene takes place in a solvent selected to control the mode of polymerization. When the reaction solvent is non-polar, the desired degree of 1,4 polymerization takes place whereas the presence of polar material in a mixed solvent results in an increased proportion of 1,2 polymerization. Polymers resulting from about 6% to about 95% of 1,2 polymerization are of particular interest. In the case of 1,4 polymerization, the presence of ethylenic unsaturation in the polymeric chain results in cis and trans configurations. Polymerization to give a cis configuration is predominant.

The graft polymer is formed by mixing a solution of the living anionic polymer with a solution containing the polymer M which is the core for grafting of the anionic polymer. When the living anionic polymer ends with a B segment the grafting efficiency will be about 50–60%. When the living anionic polymer ends with an A segment the resulting graft will be about 80–90+% efficient. Thus, the grafting efficiency may be controlled by use of A segment ends to increase the grafting efficiency of polymers that contain B segments. For example a living isoprene or butadiene homopolymer may be grafted at 80–90+% efficiency by adding or capping the living polymer with a minimal amount of A type monomer. Also suitable for this purpose would be monomers such as diphenylethylene which do not propagate well as a monomer but would be useable as an endcap to increase grafting efficiency.

Polymerization of the methacrylate and methacrylamide monomers may be carried out by several different mechanisms that are well known in the art such as free radical polymerization, coordination polymerization by organometallic complexes (principally transition metal and lanthinide), coordination polymerization by metalloporphyrin complexes, and anionic polymerization. The preferable mechanisms are free radical and anionic polymerization. The most preferable is anionic polymerization. Polymerization of the methacrylate monomers takes place in either a non-polar solvent or a mixed solvent such as cyclohexane/ether, preferably in a non-polar solvent at a temperature from about −80° C. to about 100° C., most preferably from about 10° C. to about 50° C.

The production of the polymers of structures VII and VIII requires mixing of different linear polymer arms prior to reaction with the alkylmethacrylate polymer segment.

Each B segment or block has a molecular weight from 1,000 to 300,000 prior to any coupling. Each A block has a molecular weight from 1,000 to 300,000 prior to any coupling. Each non-coupled M segment or block has a molecular weight from 500 to 1,000,000, preferably from 2,000 to 500,000 prior to reaction with the A and B blocks or segments.

The graft polymers are produced by reacting the living anionic block polymers (composed of A and/or B, etc.) with the M blocks or segments at a temperature between −10° C. and 100° C. for at least 2 minutes.

In a further modification of the graft polymers of Structures I–VIII used in the invention, the graft polymers are selectively hydrogenated to reduce the extent of unsaturation in the aliphatic portion of the polymer without substantially reducing the aromatic carbon-carbon unsaturation of any aromatic portion of the block copolymer. However, in some cases hydrogenation of the aromatic ring is desired. Thus, a less selective catalyst will work.

A number of catalysts, particularly transition metal catalysts, are capable of selectively hydrogenating the aliphatic unsaturation of a copolymer of an alkenyl aromatic compound and a conjugated alkadiene, but the presence of the M segment or block can make the selective hydrogenation more difficult. To selectively hydrogenate the aliphatic unsaturation it is preferred to employ a soluble colloidal catalyst formed from a soluble nickel compound and a trialkylaluminum. Nickel naphthenate or nickel octoate is a preferred nickel salt. This catalyst system is one of the catalysts conventionally employed for selective hydrogenation absent alkyl methacrylate blocks.

In the selective hydrogenation process, the base polymer is reacted in situ, or if isolated is dissolved in a suitable solvent such as cyclohexane or a cyclohexane-ether mixture and the resulting solution is contacted with hydrogen gas in the presence of the nickel catalyst. Hydrogenation takes place at temperatures from about 25° C. to about 150° C. and hydrogen pressures from about 15 psig to about 1000 psig. Hydrogenation is considered to be complete when at least about 90%, preferably at least 98%, of the carbon-carbon unsaturation of the aliphatic portion of the base polymer has been saturated, as can be determined by nuclear magnetic resonance spectroscopy. Under the conditions of the selective hydrogenation no more than about 5% and preferably even fewer of the units of the A blocks will have undergone reaction with the hydrogen. The selectively hydrogenated block polymer is recovered by conventional procedures such as washing with aqueous acid to remove catalyst residues and removal of the solvent and other volatiles by evaporation or distillation.

For polymers of the invention having adjacent (1-methyl-1-alkyl)alkyl ester groups, the ester groups convert to stable anhydride rings having six members after heating of the polymer to a temperature in excess of 180° C. as described in U.S. Pat. No. 5,218,053 which is incorporated by reference herein. Thermal conversion to anhydride rings likely occurs during reaction of the ester groups with primary or secondary amines facilitating the conversion reactions described in column 3, lines 32-62, of U.S. Pat. No. 4,246,374 which disclosure is incorporated by reference herein.

The graft block polymers of the invention will contain pendent reactive groups that did not react with the living anionic graft segments and have utilities conventional for such polymers. The polar polymers are particularly useful as viscosity modifying agent for motor oils, greases and gear/transmission fluids and in blends with engineering thermoplastics, asphalt compositions, adhesive formulations, including laminating adhesives for flexible packaging, sealants, fibers, and coatings formulations, especially coatings based on water emulsions. Examples of useful products include adhesives for tapes, labels, decals, and mastics. The polymers of the invention demonstrate significantly improved resistance to atmospheric hydrolysis in comparison to maleic anhydride modified polymers which have some of the same utilities.

Example 1 Poly(styrene)-Poly(t-butylmethacrylate) Graft Polymer

This example is illustrative of a bench-scale synthesis, however the reaction conditions (i.e. solvents, temperatures and reaction times) are very similar to procedures used for pilot plant runs.

A 2 liter glass reactor was charged with 1092 grams of anhydrous cyclohexane, 70 grams of anhydrous diethyl ether and 100 grams of styrene monomer that had been purified over alumina. The reaction mixture was heated to 45° C. and then pre-titrated with s-BuLi to remove protic impurities. In this particular run, 0.4 ml of 1.44M s-BuLi was required to titrate the reaction mixture. The theoretical charge of s-BuLi, 9.0 ml, was then added to initiate the polymerization of the styrene block. The styrene was allowed to react for 30 minutes.

A second reaction mixture was prepared wherein 98.6 grams of TBMA (purified by passing the monomer over 13X molecular sieves, then alumina) was added slowly instead of the styrene. The TBMA polymerization was allowed to continue for 15 minutes.

The poly(TBMA) and polystyrene were then reacted at room temperature for about one hour to permit reaction of the terminal lithium groups on the polystyryllithium with the ester groups on the poly(TBMA). The polymer was then precipitated in methanol, and then dried to a constant weight in a vacuum oven.

Example 2-Poly(styrene-1,3-butadiene)-g-P(TBMA) Graft Polymers

Using the same basic experimental procedure described in Example 1, 1,3-butadiene was added to the first reaction mixture after polymerization of the styrene. The reagents used are as follows:
Cyclohexane, 1500 ml
Diethylether, 70 g
1,3-butadiene, 96 g
s-BuLi (1.44M), 6.67 ml
TBMA, 19 g The BD block was allowed to polymerize for 45 min at 45° C. The polymerized TBMA was added, and the coupling reaction was allowed to proceed before termination with methanol.

GPC analysis showed a single peak with a peak molecular weight of approximately 16,000 g/mol. NMR confirmed the composition.

Example 3-Polybutylmethacrylate Grafted With Polystyrene

All reactions were carried out in a glove box to provide an inert atmosphere.

A 600 ml beaker was charged with 380 ml of cyclohexane, 20 ml of diethylether and 2-3 drops of diphenylethylene (titration indicator). The solution was titrated with sec-butyllithium to a light orange end point. Then 3 ml of 1.4M sec-butyllithium was added to the solution, followed by 55 ml of styrene monomer. The solution became dark orange and was allowed to polymerize for 20 minutes. Then a solution of a 50,000 g/mole (styrene e.g. by GPC) polybutylmethacrylate, dissolved in 30 ml of cyclohexane and 5 ml of diethyl ether, was added to the living polystyrene solution. (The polybutylmethacrylate was titrated with sec-butyllithium and diphenylethylene prior to adding it to the polystyrene). The viscosity increased immediately and the solution color faded to a light yellow. The reaction was stirred for 20 minutes and terminated with methanol. The reaction product was precipitated in methanol and dried under vacuum. This procedure was also used to graft polystyrene to an isobutylmethacrylate/methylacrylate copolymer and to an isobutylmethacrylate/t-butylmethacrylate copolymer. Gel Permeation Chromatography (GPC) analysis of these polymers indicated that the products are 80-90+% grafted.

Example 4-Polybutylmethacrylate Grafted With Polyisoprene

A 1 liter beaker was charged with 380 ml of cyclohexane, 20 ml of diethylether and 2-3 drops of diphenylethylene. The solution was titrated with sec-butyllithium to a light orange end point. Then 3 ml of sec-butyllithium was added and 100 ml of isoprene monomer was added in several portions and allowed to stir for 40 minutes after the last isoprene addition. A solution of 15.4 g of polybutylmethacrylate dissolved in cyclohexane and diethyl ether was titrated with sec-butyllithium and added to the living polyisoprene solution. There was an immediate increase in solution viscosity as the color turned yellow. The reaction was allowed to stir for 30 minutes and was then terminated with methanol. The product was precipitated into methanol and dried in a vacuum.

Similar results were obtained when the diethylether was replaced with diglyme and ortho-dimethoxybenzene as modifiers.

This procedure was also used to graft polyisoprene to isobutylmethacrylate/methylmethacrylate copolymers and to isobutylmethacrylate/t-butylmethacrylate copolymers. GPC analysis of the products indicated that they were 50–60% grafted.

Example 5-Anionically Polymerized Polybutylmethacrylate

In a glove box, a 1 liter polymerization bottle was charged with 315 ml of cyclohexane, 35 ml of diethyl ether and 2–3 drops of diphenylethylene. The solution was titrated with sec-butyllithium to a light orange end point. Then 1.5 ml of diphenyl ethylene was added and 5 ml of 1.4 m sec-butyllithium was reacted with it for 20 minutes. The bottle was then closed with a septum cap and removed to an ice water bath and nitrogen manifold. Then 39.15 ml of butylmethacrylate was added as quickly as possible and allowed to react for 2 minutes after the last monomer addition. The reaction was terminated with methanol at 0° C. precipitated into methanol and dried in a vacuum oven.

This procedure was used to prepare other polymethacrylate polymers for grafting as follows:

1) 80% iso-butyl methacrylate/20% methylmethacrylate
2) 60% iso-butyl methacrylate/40% methylmethacrylate, and
3) 50% iso-butyl methacrylate/50% tert-butylmethacrylate.

Example 6-S-I Diblock Grafted to Polyisobutyl Methacrylate

A 1 liter beaker was charged with 650 ml of cyclohexane and 2–3 drops of diphenylethylene. The solution was titrated with sec-butyllithium to a light yellow end point. Then 1.25 ml of 1.4 m sec-butyllithium was added followed by 21 ml of styrene monomer and allowed to react for 30 minutes. Then 103 ml of isoprene was added in 3 portions and allowed to stir for 1 hour after the last addition. Then 12 ml of a 10 wt% polyisobutylmethacrylate solution (in cyclohexane) was added. The solution viscosity increased immediately and the reaction stirred for 1 hour. The reaction was terminated with methanol. The product was precipitated in methanol and dried in a vacuum oven.

This procedure was also used to prepare a graft copolymer of the polystyrene/polyisoprene diblock polymer to an isobutylmethacrylate/methylmethacrylate copolymer and to an isobutylmethacrylate/methylmethacrylate copolymer. GPC analysis showed the products to be 50–60% grafted.

Example 7-Poly(isoprene)-g-Poly(n-butylmethacrylate)

A free-radically prepared methacrylate polymer was purchased for use as the core segment as described below. The methacrylate polymers were washed with methanol and dried in a vacuum oven prior to use. The polymers were then dissolved in either cyclohexane or a mixture of cyclohexane and diethylether, and stored over 13X molecular sieves. Gel-permeation chromatography (GPC) was used to analyze the reaction products.

In a glove box purged with nitrogen, a 400 ml beaker was charged with 180 ml of cyclohexane and 20 ml of diethylether. The solution was titrated to dryness using 2–3 drops of diphenylethylene and adding sec-BuLi until the solution became yellow/orange in color. The target amount of 1.25 ml of 1.4M sec-BuLi was added followed by 29 ml of isoprene. After a 1 hr reaction time; 100 ml of the living polymer solution was transferred into a clean 150 ml beaker and 10 ml of a poly-n-butylmethacrylate solution (the solution was prepared from 10 grams of polymer dissolved into an 80/20 cyclohexane and diethylether mixture to make 100 ml of total solution). The reaction was allowed to stir for 30 minutes and was terminated with methanol. GPC showed a shift in molecular weight from 155K for the PMA to 1053K for the graft polymer (molecular weights are given in styrene equivalents). Grafting was approximately 50–60% based on GPC data.

Example 8 -Poly(Styrene-b-Isoprene)-g-Poly(n-Butylmethacrylate) and Poly(Styrene-b-Isoprene)-g-Poly((C$_{10}$–C$_{20}$)-methacrylate)

Starting with a commercial methacrylate polymers as described in Example 7, a 400 ml beaker was charged with 180 ml of dry cyclohexane, 20 ml of dry diethylether and 2–3 drops of DPE. The solution was titrated with sec-butyllithium to an orange/yellow color and then 1.25 ml of 1.4M sec-butyllithium was added. Next, 20 ml of styrene monomer was added and allowed to polymerize for 30 minutes. Then 30 ml of isoprene monomer was added and allowed to polymerize for 90 minutes. Then 10 ml of the n-butylmethacrylate solution (10 grams in 100 ml of cyclohexane/ether solution) was added and reacted for thirty minutes. The reaction was terminated with methanol. A second anionic polymerization was performed as above and this time 10 ml of poly-(C$_{10}$–C$_{20}$)-methacrylate solution (10 grams of polymer dissolved in cyclohexane to make 100 ml of solution) was added and reacted for 30 minutes. The reaction was terminated with methanol. Both reaction products were analyzed by GPC and found to have grafted onto the methacrylate polymers. Grafting was approximately 50–60%, based on GPC data.

Example 9-(Poly-Styrene-b-Isoprene)-g-Poly-(C$_{10}$–C$_{20}$)-methacrylate-g-(Poly-Isoprene)

Starting with a commercial methacrylate polymer as described in Example 7, a 400 ml beaker was charged with 180 ml of cyclohexane, 20 ml of diethylether and 2–3 drops of DPE. The solution was titrated with sec-butyllithium to an orange/yellow color. Next, 1 ml of 1.4M sec-butyllithium was added and 15.5 ml of styrene monomer was added and reacted for 30 minutes. Then, 1 ml of 1.4M n-butyllithium was added and 20 ml of isoprene was added and reacted for 30 minutes. Two more 20 ml additions of isoprene monomer were made and reacted as above. Finally, 10 ml of the poly-(C$_{10}$–C$_{20}$)-methacrylate solution (10 grams of polymer dissolved in cyclohexane to make 100 ml of solution) was added and reacted for 30 minutes. The reaction was terminated with methanol. Both reaction products were analyzed by GPC and found to have grafted onto the methacrylate polymers. Grafting was approximately 50–60%, based on GPC data.

Example 10-Poly(Styrene)-g-Poly(n-Butylmethacrylate)

Starting with a commercial methacrylate polymer as described in Example 7, a 400 ml beaker was charged with 110 ml of a 90% cyclohexane/10% diethylether solution and 2–3 drops of DPE. The solution was titrated with sec-butyllithium to an orange/yellow color.

Then 1.25 ml of 1.4M sec-butyllithium was added and 19.25 ml of styrene was added and polymerized for 30 minutes. Then 30 ml of n-butylmethacrylate solution (the solution was prepared from 10 grams of polymer dissolved into an 80/20 cyclohexane and diethylether mixture to make 100 ml of total solution) was added and reacted for 30 minutes. GPC analysis showed that the product was 80% grafted.

Example 11 Poly(styrene-1,3-butadiene)-g-P(TBMA)

The basic experimental setup described in Example 1 was used here. The following reagents were used:
cyclohexane, 150 g
diethylether, 14.0 ml
s-BuLi, 0.40 ml
styrene, 6.4 ml
1,3-butadiene, 28 ml
P(TBMA) as a 6 wt% solution in cyclohexane/diethylether The polymerized t-butyl methacrylate (P(TBMA)) was anionically polymerized by s-BuLi at about 25° C. in cyclohexane and 6 wt% diethylether. The P(TBMA) polymerization was not terminated prior to mixing with the poly(styrene-1,3-butadiene)-Li diblock. GPC analysis of an aliquot of P(TBMA) showed the number average molecular weight to be 10,500 with a molecular weight distribution of 1.37. The living poly(styrene-1,3-butadiene)-Li diblock was polymerized by first initiating the styrene block and allowing it to react for 30 minutes at 45° C. Then 1,3-butadiene was added and allowed to react for an additional 30 minutes. An aliquot of the poly(styrene-1,3-butadiene) diblock was taken from the reactor and terminated with methanol. The GPC analysis for the diblock revealed a Mn of 40,000 (target was styrene block of 10,000 and 1,3-butadiene of 30,000). Inside a dry box, the P(TBMA) and the poly(styrene-1,3-butadiene)-Li were both quickly poured together into a third vessel and allowed to react for 2 hours. The grafting efficiency was estimated to be 45% by GPC peak areas. The product was precipitated in methanol and redissolved in THF to produce tensile bar samples and samples for dynamic thermal mechanical analysis.

The final product was a white rubbery solid that had significant tensile strength. The average tensile strength of three bars was determined to be 1780 psi. The poly(styrene-1,3-butadiene) diblock control had a tensile strength of 40–50 psi. The higher strength of the graft block copolymer demonstrates that useful and novel thermoplastic elastomers can be prepared with the present invention. Moreover, the DMTA revealed a curve typical for a well phase separated block copolymer that had two glass transition temperatures, −60° C. for the butadiene phase and +105° C. for the styrene/TBMA phase.

What is claimed is:

1. A process for making a graft polymer, comprising the steps of:
   anionically polymerizing styrene to form a first polymer having terminal reactive groups and a peak molecular weight from 1,000 to 300,000; and
   reacting the first polymer with a second polymer having pendent reactive groups and a peak molecular weight from 500 to 1,000,000, wherein the pendent reactive groups are reactive with the terminal reactive groups on the first polymer.

2. The process of claim 1, where the pendent reactive groups are selected from the group consisting of esters, anhydrides, amides, imides, nitriles, ketones, aldehydes, and halides.

3. The process of claim 1, wherein polymerization of the styrene is initiated by 1,3-butadiene or isoprene homopolymers, random copolymers or block copolymers.

4. The process of claim 1, wherein the second polymer is a poly(alkyl methacrylate) whose alkyl groups contain from 1–22 carbons.

5. The process of claim 4, wherein the poly-alkyl methacrylate is poly-iso-butylmethacrylate, poly-n-butylmethacrylate, poly-t-butylmethacrylate, or poly-methylmethacrylate or mixtures thereof.

6. The process of claim 2, wherein the first polymer consists of polymerized styrene.

7. The process of claim 2, further comprising the step of hydrogenating aliphatic unsaturation in the resulting polymer.

* * * * *